March 10, 1936.  S. WINTERS  2,033,166
MEANS FOR SUPERCHARGING INTERNAL COMBUSTION ENGINES
Filed Dec. 27, 1932
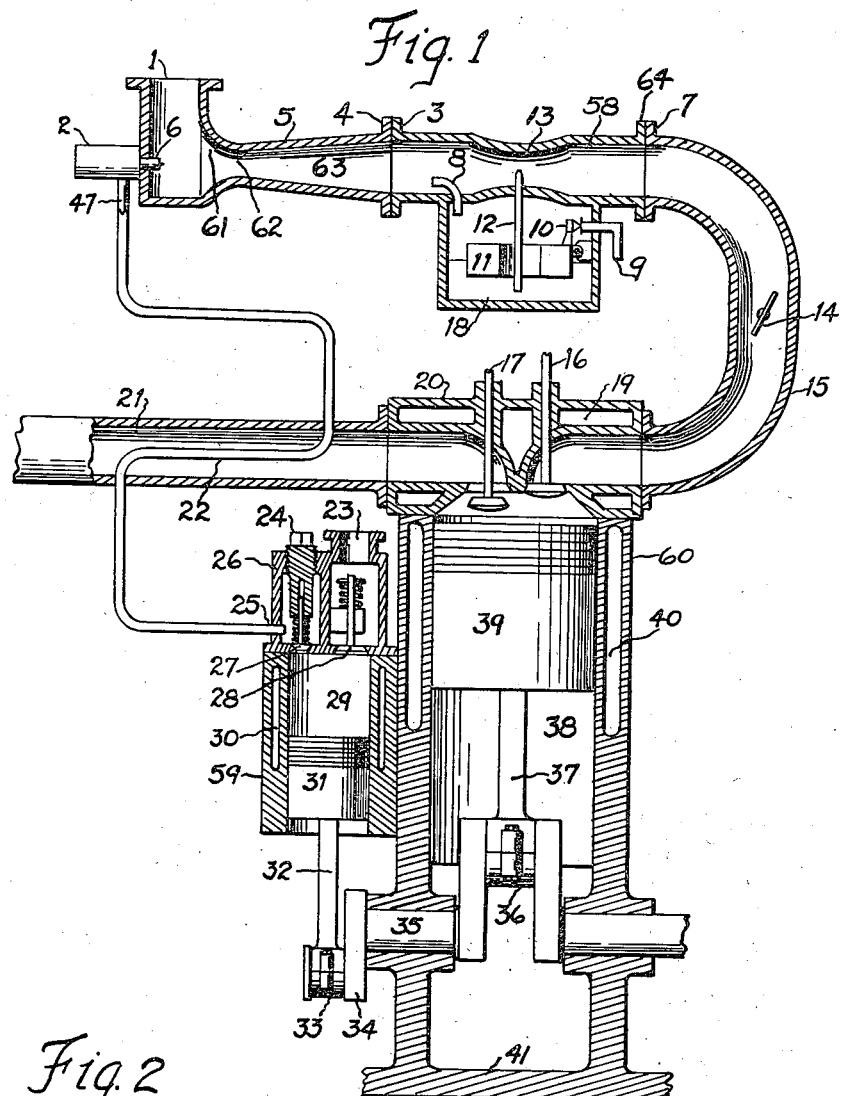
INVENTOR
Starling Winters Patented Mar. 10, 1936

2,033,166

UNITED STATES PATENT OFFICE 2,033,166

MEANS FOR SUPERCHARGING INTERNAL COMBUSTION ENGINES

Starling Winters, Albany, N. Y.

Application December 27, 1932, Serial No. 648,926

6 Claims. (Cl. 123—119)

This invention relates to an improved method of supercharging internal combustion engines and its general purpose is to provide means for increasing the power output of such an engine and also its rate of acceleration.

In principle, my invention provides for the compression of air to some suitable high pressure by means of an air compressor driven by the internal combustion engine, after which this high pressure air is allowed to expand to high velocity through a suitably proportioned nozzle. The jet of high velocity air issuing from the nozzle is directed into an air entraining and air compressing device with the result that free atmospheric air is drawn thereinto and compressed thereby. This compressed or supercharged air is conducted directly into the air intake manifold in the case of an internal combustion engine of the Diesel type. In the case of an internal combustion engine using fuel such as gasoline the supercharged air is conducted to the air intake pipe of the carburetor, with means also provided for conducting supercharged air to the carburetor fuel float chamber.

An object of this invention is to provide supercharged air for the engine by compressing in the air compressor only a fraction of the total amount of air required by the engine, the greatest portion of the air required being obtained by the inducing and compressing action of the jet of high velocity air. Most superchargers of the positive displacement type are required to displace a volume of air greatly exceeding the displacement of the engine, whereas my supercharger requires the displacement in the air compressor of only a fraction of the total air required by the engine because the work done upon this fraction of the total air may be increased at will by reducing the area of the nozzle throat, thus raising the pressure and consequently the internal energy of this fraction of the total air. This is a decided improvement in the art of supercharging engines because of the more economical use of the compressor.

Another object of this invention is to provide supercharging means whereby supercharged pressure is maintained in the intake manifold of the engine even when the throttle valve is opened wide at low speed, thus insuring rapid acceleration from low speed.

A further object of this invention is to provide means for heating the air after its compression in the air compressor so that the heat lost by the air owing to cooling the compressor may be regained before expansion through the nozzle.

A still further object of this invention is to provide supercharging means that is easily adapted to engines of standard type and principle, and that is economical of construction and operation.

The essential features of this invention are hereinafter fully described, are particularly pointed out in the appended claims and are illustrated in the accompanying drawing, in which:

Fig. 1 is a vertical sectional view of an internal combustion engine equipped with one form of supercharger of my invention.

Fig. 2 is an enlarged sectional view of the nozzle 6 and pressure maintaining mechanism 2, shown in Fig. 1.

The internal combustion engine 60, is shown very generally consisting of a cylinder 38, a piston 39 fitted therein, a connecting rod 37, a connecting rod bearing 36, a crankshaft 35, a base 41, a cylinder water jacket 40, a cylinder head 20 containing water jacket 19, inlet valve 16, and exhaust valve 17, an intake manifold 15 equipped with a throttle valve 14 and an exhaust manifold 21. The compressor 59, is very generally shown receiving power from the engine crankshaft 35 through crank 34. The compressor cylinder 29, is shown supported by the engine 60. The compressor piston 31, is shown fitted in the compressor cylinder 29, and the cylinder water jacket is designated 30. The compressor connecting rod 32, is shown fitted with connecting rod bearing 33. The compressor cylinder head 26, includes the compressor air intake opening 23, the intake valve 28, the discharge valve 27, and the discharge valve guide 24. The compressed air pipe 47, is shown connected to the compressor cylinder head at 25. The portion 22 of the supply pipe 47 is shown placed in the exhaust manifold 21, so as to receive heat from the engine exhaust gases.

The pressure maintaining nozzle shown in Fig. 2 comprises integrally, a nozzle 6, and a pressure maintaining mechanism 2. The pressure maintaining mechanism 2 has a threaded cylinder 56, a pressure cylinder 45 and a nozzle bore 43, communicating with this pressure cylinder. Compressed air is admitted to the pressure cylinder 45, from the supply pipe 47, through the passageway 48. The nozzle needle piston 57, comprises integrally, a needle 42, a piston 44 and a piston rod 55. To the piston 44 is attached metallically one end of the flexible metallic bellows 46, which has the dual purpose of preventing leakage of air while allowing axial movement of the nozzle needle piston 57. The other end of the bellows 46, is attached metallically to a metallic gasket washer 49, which is held tightly by the screw plug gasket retainer 50, to a shoulder formed by the cylinder 45 and the larger, threaded cylinder 56. The screw plug gasket retainer 50, has integral lugs for tightening, one of which is designated 51. The screw plug guide 52, serves as a guide for the piston rod 55. A spring 53 bears against plug 52 and exerts pressure against the nozzle needle piston 57. The plug 52 has integral lugs, one of which is designated 54, for the purpose of adjusting the spring pressure.

The air entraining and air compressing device 5, has an air inlet 1, a rapidly convergent portion 61, a throat portion 62 and a gradually divergent portion 63. The nozzle 6, is shown located on the axis of the throat 62 and the divergent portion 63 of the air entraining and air compressing device so as to most effectively entrain and compress free atmospheric air entering the device at 1. The air discharge 4, of the air entraining and air compressing device 5, is shown connected to the air inlet 3 of the carburetor 58. The carburetor mixture discharge 64, is shown connected to the inlet 7, of the intake manifold 15.

The carburetor 58 is shown very generally consisting of a throat portion 13, a fuel spray pipe 12, discharging therein, a fuel float chamber 18, containing float 11 and shut-off fuel valve 10, a fuel inlet pipe 9, from a fuel pump not shown and a pipe 8 to deliver supercharged air to the float chamber 18. For internal combustion engines not requiring the carburetor, air discharge 4, is connected directly to the inlet 7, of the intake manifold 15.

The operation of the supercharger is as follows: Atmospheric air is drawn into the compressor and compressed in the cylinder 29 by utilization of some of the power produced by the engine. This compressed air can only escape through the nozzle 6 so that the area of the least cross section of the nozzle determines the pressure of the air compressed. Thus if the speed of the engine and compressor is kept constant and the area of the nozzle throat is decreased, the pressure of the air will increase, producing a higher discharge velocity in order that the same amount of air may escape through the smaller nozzle throat. In this manner, a high velocity may be given to the air discharging from the nozzle by reducing the nozzle throat area to some appropriate size. The discharge of high velocity air from the nozzle entrains free atmospheric air which enters at 1, and the whole mass of air acquires some resultant high velocity in the throat portion 62 of the air entraining and air compressing device 5. As the air passes through the throat 62 and into the divergent portion 63, the velocity falls and the pressure increases to the supercharged pressure. This supercharged air passes through the carburetor 58 and enters the intake manifold 15 for delivery to the engine. The tube 8 is for the purpose of supercharging the carburetor so that fuel will flow through the spray pipe 12 in the normal manner. The fuel pump (not shown) which supplies fuel through the pipe 9 must be capable of pumping against the supercharged air pressure.

In testing a four cylinder automobile equipped with my supercharger having a fixed throat nozzle, I observed that the air pressure at the nozzle was in excess of 200 lbs. per sq. in. at a car speed of 45 miles per hour, and at 10 miles per hour the air pressure at the nozzle was about 50 lbs. per sq. in. The acceleration obtained under these conditions on level ground, while in high gear and from a speed of 10 miles per hour was about the same as obtainable in second gear under the same conditions but without supercharging. When the fixed throat nozzle was replaced with a pressure maintaining type the pressure at the nozzle held to approximately 175 lbs. per sq. in. at 10 miles per hour and greatly increased acceleration from this speed was observed.

The operation of the pressure maintaining nozzle is as follows: Compressed air enters the pressure cylinder 45 from the supply pipe 47 causing the nozzle needle 42 to take a position in the nozzle bore 43 which is determined by the quantity of air supplied. As the supply of air increases due to increased compressor speed the pressure increases sufficiently to cause movement of the piston 44 against the pressure spring 53. This movement increases the effective nozzle throat area and allows the pressure to decrease to a value slightly above the original pressure. The important feature of the pressure maintaining nozzle is the fact that approximately normal nozzle pressure is maintained even though the supply of air is greatly reduced. Thus the velocity of air issuing from the nozzle is maintained at its normal high value even though the engine and compressor speed may be low, with the result that rapid acceleration of the engine from low speed is obtained.

As far as I am aware my invention is novel in that a jet of extremely high velocity air is employed which is allowed to act directly upon air rather than upon explosive mixture, thus insuring that a pre-determined ratio of fuel to air is maintained. It is extremely difficult, practically, to maintain constant ratio of fuel to air when a jet of elastic fluid is allowed to act directly upon explosive mixture with the object of increasing the flow. I am also aware that various forms of superchargers have been proposed from time to time based upon the aspiration of explosive mixture flowing from a carburetor to an engine cylinder by utilizing some source of low pressure fluid such as exhaust gas and allowing the same to discharge through a converging nozzle located in the mixture pipe between the carburetor and engine cylinder, however, I believe my invention is novel in that it requires, in its simplest aspect, the compression of air to high pressure by a compressor driven by an engine, discharge of this air to high velocity through a nozzle so proportioned as to produce this high pressure and entrainment and compression of free atmospheric air by the action of the jet of high velocity air in discharging into an air entraining and compressing device.

The advantage of heating the compressed air is one of efficient operation and may be explained as follows: It is well known that it is desirable to cool a compressor. First, the power required to compress a given quantity of air may be reduced if heat is abstracted from the air as it is compressed. Second, proper lubrication and long life of the compressor is assured if its parts do not reach too high a temperature. If, however, the air after compression is allowed to expand to atmospheric pressure without heating before expansion the final temperature of this air will be much lower than the original air temperature. Heating of the compressed air before expansion is desirable in some cases but it is not to be inferred that this is always the case nor that the operative completeness of my supercharger depends upon this feature except as set forth in the appended claims.

While I do not claim invention in regard to the form or construction of the engine and compressor as shown, it is understood that I do not purpose limiting the patent in regard to engine and compressor as to type, number of cylinders, method of cooling and method of drive, nor in regard to the nozzle and air entraining and air compressing device as to the exact form of construction as shown, except as applies to their proper functioning and application and the appended claims.

Having thus described my invention, what I claim is:

1. In a supercharger system, a compressor, a pressure maintaining nozzle consisting generally of a nozzle bore, a tapered member supported co-axially therein, a pressure cylinder, a piston free to move in said cylinder and connected to said tapered member, an inlet for conducting pressure fluid to said cylinder and to said nozzle bore, a spring opposing the force of pressure fluid acting upon said piston and means for preventing leakage of pressure fluid from said cylinder, means for conducting pressure fluid from compressor to pressure maintaining nozzle, means for heating pressure fluid after compression by utilizing engine exhaust heat, an air entraining and air compressing device so disposed that the discharge of pressure fluid from said pressure maintaining nozzle plus inducted free atmospheric air is received thereinto, a carburetor receiving supercharged air from said air entraining and air compressing device, means for supplying supercharged air to the fuel float chamber of said carburetor, an internal combustion engine receiving explosive mixture from said carburetor and means for driving said compressor by said internal combustion engine.

2. In a supercharger system, a compressor, a pressure maintaining nozzle consisting generally of a nozzle bore, a tapered member supported co-axially therein, a pressure cylinder, a piston free to move in said cylinder, means for attaching said tapered member to said piston, an inlet for conducting pressure fluid to said cylinder and to said nozzle bore, a spring opposing the force of pressure fluid acting upon said piston and means for preventing leakage of pressure fluid from said cylinder consisting generally of a flexible metallic bellows fixed on one end to the cylinder wall and secured on its free end to said piston, means for conducting pressure fluid from compressor to pressure maintaining nozzle, means for heating pressure fluid after compression by utilizing engine exhaust heat, an air entraining and air compressing device so disposed as to receive thereinto the discharge of pressure fluid from said pressure maintaining nozzle plus inducted free atmospheric air, an internal combustion engine receiving supercharged air from said air entraining and air compressing device and means for supplying power to said compressor from said internal combustion engine.

3. In a supercharger system, an air compressor, a pressure maintaining nozzle embodying a variable throat the annular area of which increases as the quantity of air delivered thereto increases, means for conducting compressed air to said pressure maintaining nozzle from said air compressor, a combined air entraining and air compressing device disposed so as to receive thereinto the discharge of air from said pressure maintaining nozzle plus inducted free atmospheric air, a carburetor receiving supercharged air from the discharge tube of said combined air entraining and air compressing device, means for supplying supercharged air to the fuel float chamber of said carburetor, an internal combustion engine receiving explosive mixture from said carburetor and means for driving said air compressor by utilizing power from said internal combustion engine.

4. In a supercharger system, an air compressor, a pressure maintaining nozzle embodying a variable throat the annular area of which is determined by the quantity of air delivered thereto, means for conducting compressed air to said pressure maintaining nozzle from said air compressor, a combined air entraining and air compressing device disposed so as to receive thereinto the discharge of air from said pressure maintaining nozzle plus inducted free atmospheric air, an internal combustion engine receiving supercharged air from the discharge tube of said combined air entraining and air compressing device and means for driving said air compressor by utilizing power from said internal combustion engine.

5. In combination with an internal combustion engine having a carburetor, a venturi delivering to said carburetor and having an atmospheric air intake, an air compressor having a separate air intake, a nozzle discharging into said venturi and comprising a nozzle barrel, a pressure cylinder communicating therewith, an air inlet to said pressure cylinder, a piston within said pressure cylinder, a tapered member supported co-axially within said nozzle barrel and connected to said piston, a spring opposing the air pressure acting against said piston, external means for changing the spring pressure, a conduit delivering air from said compressor to said nozzle air inlet and having a portion of its length heated by engine exhaust, and a connection between engine and compressor crankshafts.

6. In combination with an internal combustion engine, means whereby high velocity air is discharged in impelling relation to a flow of combustible mixture, means including a nozzle having a variable throat area whereby the velocity of the impelling air is controlled without throttling the flow, compressing means for continuously supplying impelling air and means for heating impelling air after compression by employing heat from engine exhaust gases.

STARLING WINTERS.